(12) United States Patent
Mizuno et al.

(10) Patent No.: US 8,900,089 B2
(45) Date of Patent: Dec. 2, 2014

(54) CARRIER ASSEMBLY FOR SUPPORTING PINION GEARS

(75) Inventors: Yota Mizuno, Nissin (JP); Kenji Odaka, Toyota (JP); Takayoshi Kato, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 136 days.

(21) Appl. No.: 12/878,141

(22) Filed: Sep. 9, 2010

(65) Prior Publication Data

US 2011/0009233 A1      Jan. 13, 2011

Related U.S. Application Data

(63) Continuation of application No. PCT/JP2009/000844, filed on Feb. 26, 2009.

(30) Foreign Application Priority Data

Mar. 11, 2008   (JP) ................................ 2008-061092

(51) Int. Cl.
*F16H 57/08*   (2006.01)
*F16H 3/72*   (2006.01)
*F16H 37/08*   (2006.01)

(52) U.S. Cl.
CPC ...... *F16H 57/082* (2013.01); *F16H 2200/2023* (2013.01); *F16H 2200/2035* (2013.01); *F16H 3/728* (2013.01); *F16H 2200/2007* (2013.01); *F16H 2037/0886* (2013.01)
USPC ........................................................ 475/331

(58) Field of Classification Search
CPC .................................................. F16H 57/082
USPC .......................................... 475/331; 72/379.2
See application file for complete search history.

(56) References Cited

U.S. PATENT DOCUMENTS 1,964,730 A * 7/1934 Harris ........................... 475/335
2,118,948 A * 5/1938 Schuyler et al. ................ 70/453

(Continued)

FOREIGN PATENT DOCUMENTS

DE      601 09 978 T2    2/2006
JP       2005264285 A    9/2005

(Continued)

OTHER PUBLICATIONS

International Search Report for the corresponding International Patent Application No. PCT/JP2009/000844.

(Continued)

*Primary Examiner* — Gene Crawford
*Assistant Examiner* — Terry Chau
(74) *Attorney, Agent, or Firm* — Gifford, Krass, Sprinkle, Anderson & Citkowski, P.C.

(57) ABSTRACT

The present invention is aimed to provide a carrier assembly which can be made small in size while securing a sufficient fixing strength between a first carrier plate and a second carrier plate. The second carrier plate (8) has a plurality of connection elements (23) bent toward the first carrier plate (7) to weld and fix the outwardly projected end portions (23b) of the connection elements with the outwardly projected end portion of the first carrier plate (7) by electron beam welding. The connection elements each have a base portions (23a) formed with a notch (28). The notch (28) thus formed makes a gap S between the base portion of the connection element and the corner portion (29) of the pinion gear.

4 Claims, 9 Drawing Sheets

(56) References Cited

U.S. PATENT DOCUMENTS

| | | | |
|---|---|---|---|
| 3,527,121 A | * | 9/1970 | Moore ............... 475/338 |
| 3,939,736 A | * | 2/1976 | Morin ............... 475/338 |
| 5,292,292 A | * | 3/1994 | Heinrich et al. ........ 475/331 |
| 5,470,286 A | * | 11/1995 | Fan ................ 475/331 |
| 5,658,215 A | * | 8/1997 | Premiski et al. ........ 475/331 |
| 5,689,435 A | * | 11/1997 | Umney et al. .......... 703/1 |
| 6,144,896 A | * | 11/2000 | Kask et al. ........... 700/182 |
| 6,481,259 B1 | * | 11/2002 | Durney .............. 72/324 |
| 7,104,863 B2 | * | 9/2006 | Mimlitch et al. ........ 446/94 |
| 7,214,160 B2 | * | 5/2007 | Illerhaus ............ 475/331 |
| 7,534,189 B2 | | 5/2009 | Inagaki et al. |
| 7,608,005 B2 | * | 10/2009 | Metten et al. ......... 475/159 |
| 2001/0018381 A1 | | 8/2001 | Suzumura et al. |
| 2004/0023749 A1 | * | 2/2004 | Zelikov et al. ........ 475/331 |
| 2004/0082432 A1 | | 4/2004 | Suzumura et al. |
| 2004/0235610 A1 | | 11/2004 | Jang et al. |
| 2008/0188338 A1 | * | 8/2008 | Kimes et al. .......... 475/148 |
| 2013/0157802 A1 | * | 6/2013 | Ordonez Vicente et al. . 475/348 |

FOREIGN PATENT DOCUMENTS

| | | |
|---|---|---|
| JP | 2007139061 A | 6/2007 |
| JP | 2007301565 A | 11/2007 |

OTHER PUBLICATIONS

Office Action from corresponding German Application No. 11209000602.7 dated Mar. 22, 2012 with English language translation.

\* cited by examiner

PRIOR ART

PRIOR ART

US 8,900,089 B2

CARRIER ASSEMBLY FOR SUPPORTING PINION GEARS

CROSS-REFERENCE TO RELATED APPLICATIONS

This application is a continuation of Application PCT/JP2009/000844 filed on Feb. 26, 2009. Application PCT/JP2009/000844 claims priority of Application JP2008-061092 filed on Mar. 11, 2008, in Japan.

FIELD OF THE INVENTION

The present invention relates to a carrier assembly, and more particularly to a carrier assembly for connecting a first carrier plate and a second carrier plate through connection elements and for rotatably supporting pinion gears between the first carrier plate and the second carrier plate.

BACKGROUND OF THE INVENTION

In general, a planetary gear is used for an automatic transmission mounted on an automobile and other vehicles, and comprises a carrier having a plurality of pinion gears, a sun gear positioned at the center of the planetary gear and held in mesh with the pinion gears, and a ring gear positioned to surround the sun gear and held in mesh with the pinion gears. The carrier has two carrier plates. One of the carrier plates has a plurality of connection elements mounted thereon. The connection elements are bent and have respective outwardly projected end portions thereof connected to the other of the carrier plates to ensure that the two carrier plates support the axial end portions of a plurality of pinion shafts rotatably supporting the pinion gears. The carrier plates, the pinion shafts, and the pinion gears constitute as a whole a carrier assembly.

The conventional carrier assembly of this kind so far known is shown in FIG. 6. FIG. 6 is a cross sectional view of a carrier assembly forming part of a planetary gear to be used for an automatic transmission to be mounted on an automobile. In FIG. 6, a first carrier plate 51 is mounted on one end portion of an input shaft 52 drivably connected to an engine not shown. The first carrier plate 51 has a radially inner portion formed with a plurality of first shaft holes 51a equally spaced apart from one another in the circumferential direction of the first carrier plate.

The first carrier plate 51 is positioned in opposing relationship with a second carrier plate 53 which has a radially inner portion formed with a plurality of second shaft holes 53a in opposing relationship with the respective first shaft holes 51a.

Between the first shaft holes 51a and the second shaft holes 53a opposing to one another, there are pinion shafts 54. The pinion shafts 54 have pinion gears 55 each rotatably mounted thereon, the pinion gears 55 being held in mesh with a sun gear 56 shown by phantom lines in FIG. 7.

FIGS. 8A and 8B respectively show the first carrier plate 51 and the second carrier plate 53 pressed and shaped by a press working. As shown in FIG. 8B, the second carrier plate 53 has a radially outer peripheral portion formed with a plurality of connection elements 57, each projecting radially outwardly of the second carrier plate 53. In FIG. 8B, reference numeral 57a indicates a base portion forming part of each of the connection elements 57.

The above carrier assembly is assembled in such a manner that the connection elements 57 of the second carrier plate 53 are bent toward the first carrier plate 51 to weld and fix the respective outwardly projected end portions 57b of the connection elements 57 with the radially outer peripheral portion of the first carrier plate 51. In this manner, the first carrier plate 51 and the second carrier plate 53 are connected with each other with each of the connection elements 57 being circumferentially interposed between the pinion gears 55 (for example see Patent Document 1).

Patent Document 1: Japanese Patent Publication No. 2007-139061

SUMMARY OF THE INVENTION

Problems to be Solved

As will be seen from the foregoing description, the conventional carrier assembly is constructed to have the connection elements 57 bent toward the first carrier plate 51 to weld and fix the outwardly projected end portions 57b of the connection elements 57 with the radially outer peripheral portion of the first carrier plate 51. The conventional carrier assembly thus constructed leads to the fact that the bent base portions 57a of the connection elements 57 are each brought into frictional contact with the corner portion 55a of the pinion gear 55 as shown in FIG. 9, thereby making it difficult to make the carrier assembly small in size. FIG. 9 shows the positional relationship between the pinion gear 55 and the connection element 57 as seen in the direction indicated by the arrow B in FIG. 7.

In the state before the connection elements 57 are bent toward the first carrier plate 51, i.e., in the state of the second carrier plate 53 developed immediately after being pressed and shaped by a press working as shown in FIG. 8B, the base portions 57a of the connection elements 57 each have both side portions formed in a "R" shape, i.e., chamfered, resulting from ensuring a sufficient mechanical strength to a die assembly when the second carrier plate 53 is pressed and shaped by the press working.

The reason why the base portions 57a of the connection elements 57 each have both side portions formed in the "R" shape is such that the die assembly is apt to be damaged at its portion corresponding to the both side portions of the base portions 57a when the second carrier plate 53 is pressed and shaped by the press working if each of the both side portions of the base portion 57a has a nearly right-angled corner.

The fact that each of the base portions 57a of the connection elements 57 has both side portions formed in the "R" shape leads to the fact that the base portions 57a of the connection elements 57 are each curved toward the corner portion 55a of the pinion gear 55 and then brought into frictional contact with the corner portion 55a of the pinion gears 55 when the base portions 57a of the connection elements 57 are bent as shown in FIG. 9. As stated hereinbefore, FIG. 9 shows the positional relationship between the pinion gear and the connection element as seen in the direction indicated by the arrow B in FIG. 7.

To avoid each of the base portions 57a of the connection elements 57 from being in frictional contact with the corner portion 55a of the pinion gear 55, it is considered to radially enlarge the respective diameters of the first and second carrier plates 51, 53. This consideration, however, cannot make the carrier assembly small in size.

Further, to avoid each of the base portions 57a of the connection elements 57 from being in the frictional contact with the corner portion 55a of the pinion gear 55, it is also considered to make the connection elements small in width. This consideration, however, leads to the fact that the outwardly projected end portion 57b of the connection element 57 and the radially outer peripheral portion of the first carrier plate 51 become small in welding areas therebetween. This results in that the connection element 57 and the first carrier plate 51 become small in weld strength, thereby lowering the fixing strength between the first carrier plate 51 and the second carrier plate 53.

It is therefore difficult to make the conventional carrier assembly small in size while maintaining the fixing strength of the first carrier plate 51 and the second carrier plate 53 at a satisfactory level. This means that the conventional carrier assembly has a room to improve in this regard.

The present invention has been made to overcome the above-mentioned conventional problem encountered by the conventional carrier assembly. It is therefore an object of the present invention to provide a carrier assembly which can be made small in size while maintaining the fixing strength of the first carrier plate and the second carrier plate at a satisfactory level.

In order to achieve the object of the present invention, the carrier assembly according to the present invention comprises a first carrier plate formed with a plurality of first shaft holes radially inwardly positioned and circumferentially spaced apart from each other; second carrier plate positioned in opposing relationship with the first carrier plate and formed with a plurality of second shaft holes radially inwardly positioned in opposing relationship with the first shaft holes; a plurality of pinion shafts extending through the respective first and second shaft holes; a plurality of pinion gears rotatably supported on the respective pinion shafts and held in mesh with a sun gear; and a plurality of connection elements each arranged between the second shaft holes in the circumferential direction of the second carrier plate and radially outwardly projecting from the radially outer peripheral portion of the second carrier plate; wherein the connection elements are each bent toward the first carrier plate to fix the outwardly projected end portion of the connection element with the radially outer peripheral portion of the first carrier plate so as to have the first carrier plate and the second carrier plate connected with each other with the connection elements each being circumferentially interposed between the pinion gears; and the connection elements each have a base portion in close proximity to the radially outer peripheral portion of the second carrier plate, the base portion being formed with a receded portion making a gap between the base portion of the connection element and the corner portion of the pinion gear in close proximity to the radially outer peripheral portion of the second carrier plate to prevent the base portion of the connection element from being brought into frictional contact with the corner portion of the pinion gear.

It is preferable that the receded portion is constituted by a notch dented in the circumferential direction of the second carrier plate at the base portion of the connection element.

It is also preferable that the outwardly projected end portion of the connection element is fixed with the radially outer peripheral portion of the first carrier plate by welding or pressure bonding.

Advantageous Effects of Invention

According to the carrier assembly of the present invention, each of the base portions in close proximity to the radially outer peripheral portion of the second carrier plate is formed with a receded portion by an easy working to make a gap between the base portion of the connection element and the corner portion of the pinion gear in close proximity to the radially outer peripheral portion of the second carrier plate. As a result, the corner portion of the pinion gear can be prevented from being brought into frictional contact with the base portion of the connection element.

Accordingly, a sufficiently wide width of the connection element can ensure to form a wide attached area between the outwardly projected end portion of the connection element and the radially outer peripheral portion of the first carrier plate, thereby making it possible to securely connect the first carrier plate and the second carrier plate with a sufficient fixing strength. In addition, the carrier assembly can be made small in size because of the first and second carrier plates not required to have respective diameters enlarged in the radial direction thereof.

BRIEF DESCRIPTION OF THE DRAWINGS

The characteristic and advantageous aspects of the present invention will become apparent from the following detailed description and the accompanying drawings.

DETAILED DESCRIPTION OF THE PREFERRED EMBODIMENTS

The embodiment of the carrier assembly according to the present invention will be described hereinafter with reference to the drawings.

FIGS. 1 to 5 are views showing one embodiment of the carrier assembly according to the present invention, and showing an example of the carrier assembly applied to a hybrid vehicle.

Figure 1:
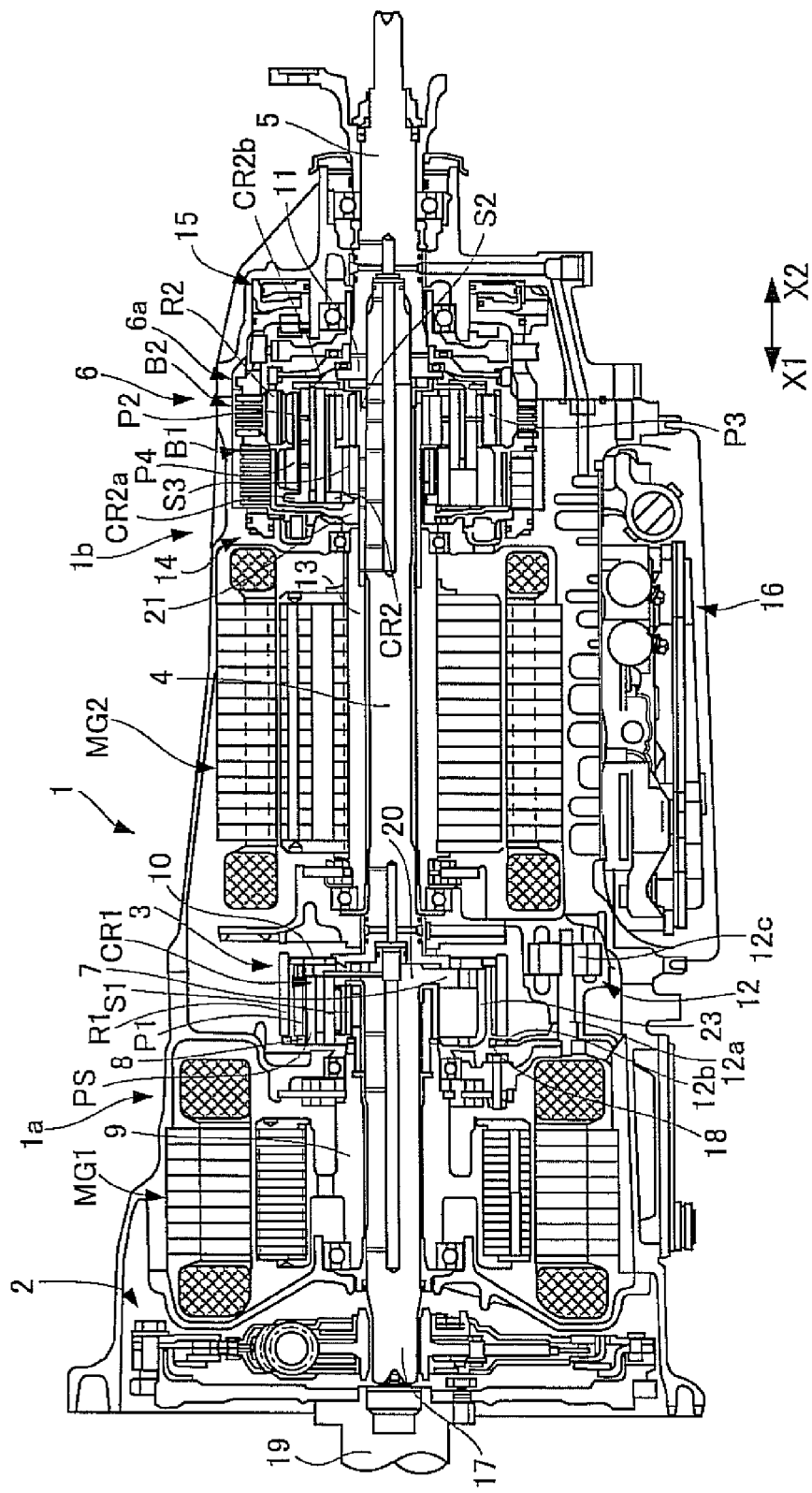
FIG. 1 is a view showing one embodiment of the carrier assembly according to the present invention, and a constitution view showing a drive unit of a hybrid vehicle provided with the carrier assembly.

The hybrid vehicle is shown in FIG. 1 to be constituted by a two-motor split type of hybrid vehicle, and comprises an internal combustion engine, not shown in the drawings, for outputting a driving force, a drive unit 1 drivably connected to the engine, and rear wheels, not shown in the drawings, drivably connected to the drive unit 1 through a differential apparatus, also not shown in the drawings.

A first drive means 1a comprises a driving force distributing planetary gear 3 drivably connected to the engine for example through a dumper apparatus 2, and a first motor MG1 drivably connected to the driving force distributing planetary gear 3. The first motor MG1 is connected to an output shaft 5 through the driving force distributing planetary gear 3 and a transmitting shaft 4.

A second drive means 1b comprises a second motor MG2, and a multistage transmission 6 interposed between the second motor MG2 and the output shaft 5. The second motor MG2 is thus drivably connected to the output shaft 5 through the multistage transmission 6.

A carrier CR1 has a plurality of pinion gears P1 rotatably supported by a first carrier plate 7 and a second carrier plate 8. A sun gear S1 is held in mesh with the pinion gears P1 and drivably connected to a rotor shaft 9 forming part of the first motor MG1. The pinion gears P1 are held in mesh with a ring gear R1 which is secured to a support member 10 in a hollow and cylindrical shape. The ring gear R1 is drivably connected to the transmitting shaft 4 through the support member 10.

The transmitting shaft 4 has a rear end portion (in the direction X2 indicated by the double arrow) drivably connected to the multistage transmission 6 having a planetary gear 6a. More specifically, the output shaft 5 drivably connected to the transmitting shaft 4 is drivably connected to a carrier CR2 forming part of the planetary gear 6a through a hub member 11.

The carrier CR2 comprises long pinion gears P2, P4 and a short pinion gear P3 rotatably supported by carrier plates CR2a, CR2b. The long pinion gears P2, P4 are respectively small diameter pinion gear and large diameter pinion gear integrally formed with each other, the small diameter gear P2 being held in mesh with the short pinion gear P3.

The short pinion gear P3 is held in mesh with a sun gear S2 which is in turn drivably connected to a rotor shaft 13 forming part of the second motor MG2. The pinion gear P4 is held in mesh with a sun gear S3 which is in turn drivably connected to a hub member 21.

The hub member 21 is splined to friction plates of a first brake B1 of a multi-plate type. The first brake B1, therefore, can be engaged with the sun gear S3 by making the oil pressure of a hydraulic servomechanism 14 operate to the first brake B1.

The short pinion gear P3 is held in mesh with a ring gear R2 which is in turn splined to friction plates of a second brake B2 of a multi-plate type. The second brake B2, therefore, can be engaged with the ring gear R2 by making the oil pressure of a hydraulic servomechanism 15 operate to the second brake B2.

The transmitting shaft 4 is drivably connected to the output shaft 5 which is in turn drivably connected to the differential apparatus through a coupling, a propeller shaft and other driving means not shown in the drawings. The output shaft 5 is drivably connected to drive wheels (rear wheels) through right and left drive shafts from the differential apparatus.

On the other hand, the drive unit 1 comprises an oil pump apparatus 12 of a mechanical type drivably connected to the engine, and an oil pressure control apparatus 16 designed to receive oil supplied by the oil pump apparatus 12 and supply the oil to the multistage transmission 6 and the second motor MG2 for lubricating and cooling the multistage transmission 6 and the second motor MG2, and to the hydraulic servomechanisms 14, 15.

The oil pump apparatus 12 is disposed below the driving force distributing planetary gear 3 and driven by an input shaft 17. The oil pump apparatus 12 comprises a drive shaft 12a for driving the oil pump apparatus 12, an input gear 12b disposed on the drive shaft 12a, and an oil pump body 12c. The input gear 12b is held in mesh with an annular gear 18. The oil pump apparatus 12 is drivably connected to the input shaft 17.

The driving force transmitting operation of the hybrid vehicle will be described hereinafter with reference to FIG. 1. As shown in FIG. 1, the engine outputs an engine torque as a driving force. At this time, the engine torque is inputted to the carrier CR1 of the driving force distributing planetary gear 3 through a crankshaft 19, the dumper apparatus 2, the input shaft 17, and a flange portion 20.

When the first motor MG1 is torque controlled to regenerate an electric power, a part of the engine torque is distributed to the first motor MG1. The torque of the first motor MG1 is then delivered to the rotor shaft 9 and the sun gear S1 as a reaction force.

The rotation of the sun gear S1 causes the ring gear R1 to rotate, while the remaining part of the engine torque is distributed. This means that the driving force outputted from the first driving means 1a is transmitted to the transmission shaft 4.

The multistage transmission 6 serves to change speeds with the first brake B1 or the second brake B2 being brought into its engagement state when the oil pressure control apparatus 16 is operated to supply the oil under pressure to the oil pressure servomechanism 14 of the first brake B1 or the oil pressure servomechanism 15 of the second brake B2.

In the state that the first brake B1 is under the engagement state while the second brake B2 is under the release state, the sun gear S3 is fixed and not rotated by the first brake B1. At this time, the sun gear S3 fixed and not rotated and the sun gear S2 rotated by the second motor MG2 cause the multistage transmission 6 to make the carrier CR2 take a high speed stage (Hi) in which the carrier CR2 is rotated at a high speed.

Then, in the state that the second brake B2 is under the engagement state while the first brake B1 is under the release state, the ring gear R2 is fixed and not rotated by the second brake B2. At this time, the ring gear R2 fixed and not rotated and the sun gear S2 rotated by the second motor MG2 cause the multistage transmission 6 to make the carrier CR2 take a low speed stage (Lo) in which the carrier CR2 is rotated at a low speed.

Then, in the state that the first and second brakes B1, B2 are both under the release states, both of the sun gear S3 and the ring gear R2 are held freely rotatable. At this time, the sun gear S3 and the ring gear R2 held freely rotatable causes the multistage transmission 6 to become under its neutral state with the sun gear S2, i.e., the second motor MG2 being disengaged from the carrier CR2.

The torque outputted from the second motor MG2 is transmitted to the sun gear S2 through the rotor shaft 13. At this time, the transmitted torque is a relatively large torque if the transmission 6 is switched to take the low speed stage (Lo), while the transmitted torque is a relatively small torque if the multistage transmission 6 is switched to take the high speed stage (Hi). The transmitted torque is then outputted to the carrier CR2. This means that the driving force outputted from the second driving means 1b is transmitted to the output shaft 5.

The torque outputted from the first driving means 1a and the torque outputted from the second driving means 1b are combined and outputted from the output shaft 5 of the drive unit 1 as a total output torque (driving force to be outputted to the drive wheels). The total output torque is then outputted to the differential apparatus through the coupling, the propeller shaft and other driving force transmitting means, and is then outputted to the drive wheels (the rear wheels) through the right and left drive shafts from the differential apparatus.

The construction of the driving force distributing planetary gear 3 will then be described hereinafter. The driving force distributing planetary gear 3 is shown in FIG. 1 as comprising the carrier CR1 drivably connected to the input shaft 17, the sun gear S1 drivably connected to the first motor MG1, and the ring gear R1 drivably connected to the transmission shaft 4.

The sun gear S1 is constituted by a gear in the form of a hollow shaft and having external teeth. The sun gear S1 is rotatably supported on the input shaft 17 received in the hollow shaft. The sun gear S1 is held in mesh with the pinion gears P1 and splined to the rotor shaft 9 of the first motor MG1.

The pinion gears P1 are held in mesh with the ring gear R1 which is constituted by a gear in the form of a hollow shaft and having internal teeth. The ring gear R1 is drivably connected to the support member 10 in the form of a drum and further drivably connected to the transmission shaft 4 through the support member 10.

Figure 2:
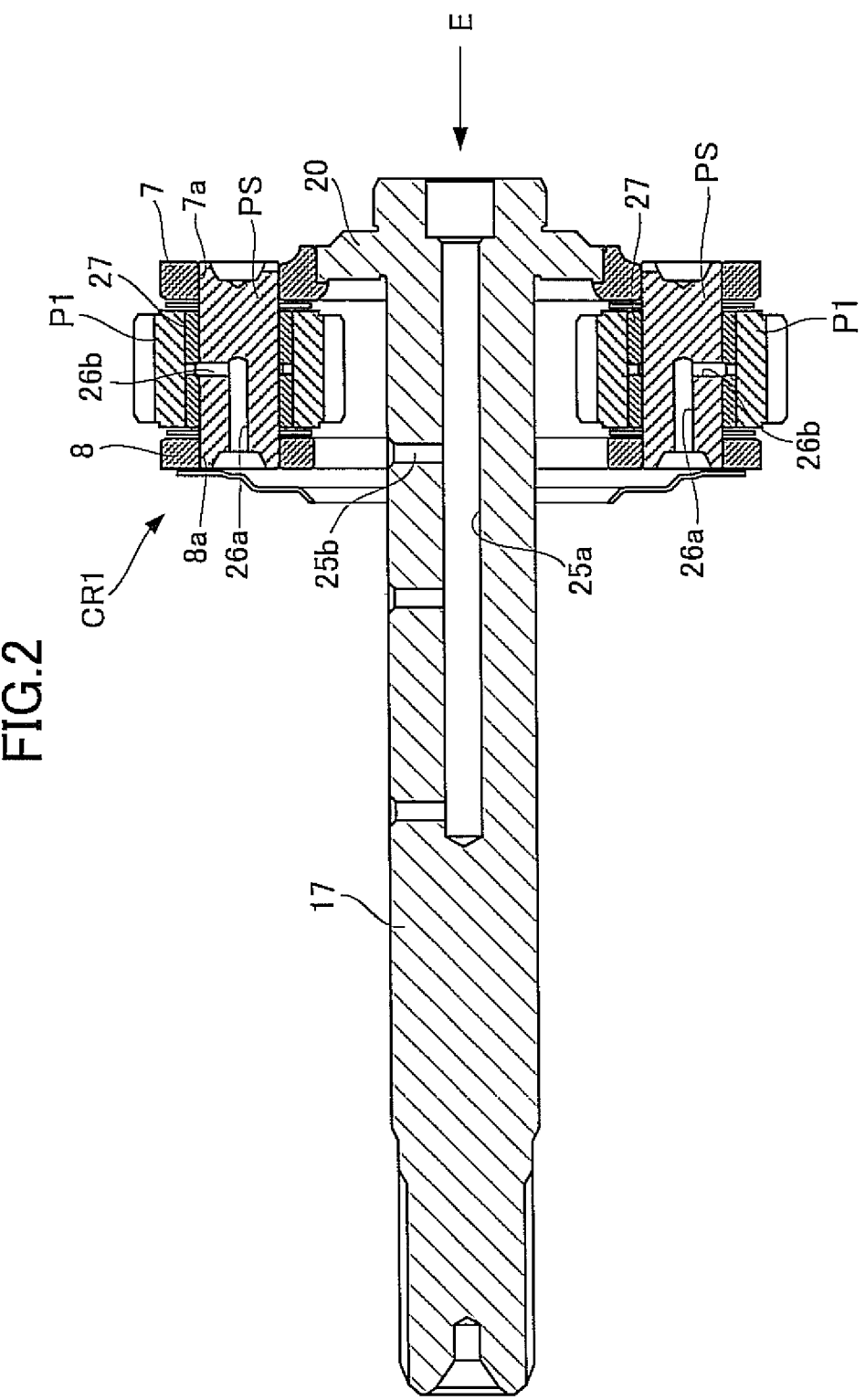
FIG. 2 is a view showing one embodiment of the carrier assembly according to the present invention, and a cross-sectional view taken along the line D-D in FIG. 3.

As shown in FIGS. 1 and 2, the carrier CR1 forming part of the carrier assembly comprises the first carrier plate 7 in the form of a disc attached to the flange portion 20 provided on the end portion of the input shaft 17 and formed with a plurality of first shaft holes 7a which are radially inwardly positioned and circumferentially spaced apart from each other, the second carrier plate 8 in the form of a disc positioned in opposing relationship with the first carrier plate 7 and formed with a plurality of second shaft holes 8a which are radially inwardly positioned in opposing relationship with the first shaft holes 7a, a plurality of pinion shafts PS extending through the respective first and second shaft holes 7a, 8a, and the pinion gears P1 rotatably supported on the respective pinion shafts PS. The pinion gears P1 are held in mesh with the sun gear 51 and the ring gear R1.

Figure 3:
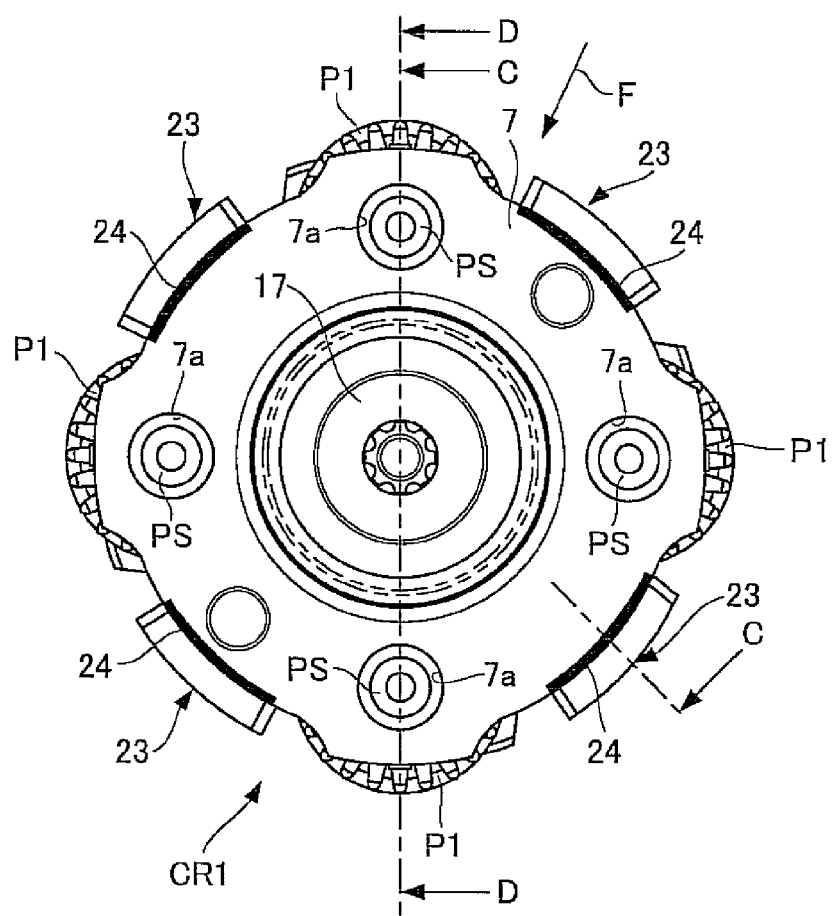
FIG. 3 is a view showing one embodiment of the carrier assembly according to the present invention, and a view as seen in the direction indicated by the arrow E in FIG. 2.
Figure 4A:
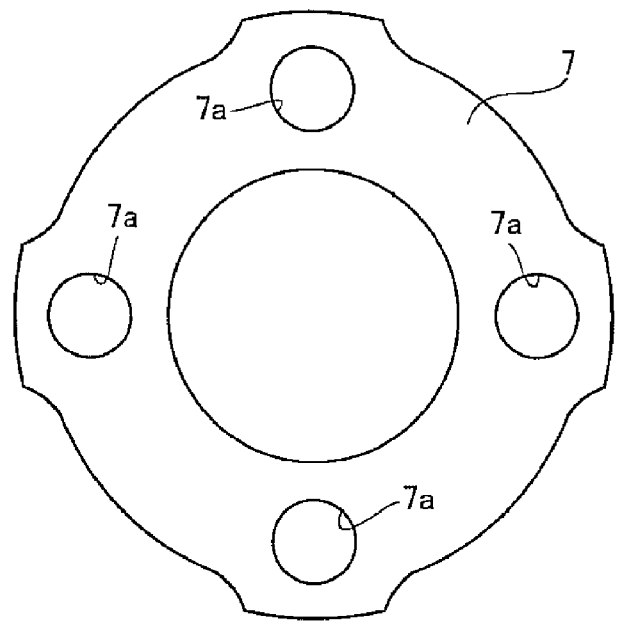
FIG. 4A is a view showing one embodiment of the carrier assembly according to the present invention, and a plan view of the first carrier plate pressed and shaped by a press working.
Figure 4B:
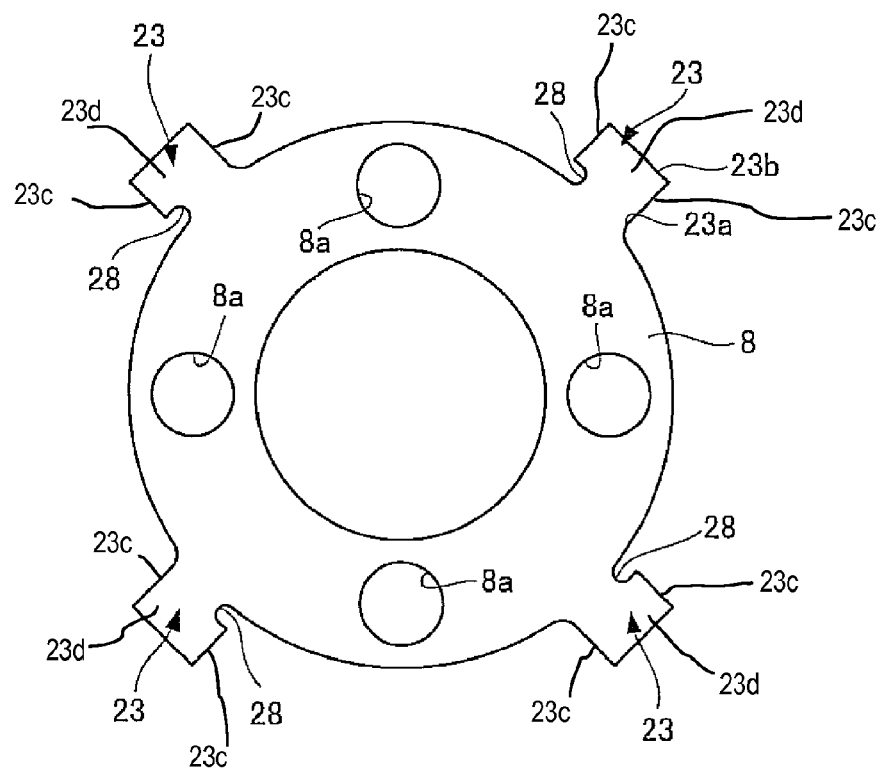
FIG. 4B is a view showing one embodiment of the carrier assembly according to the present invention, and a plan view of the second carrier plate pressed and shaped by a press working.

As shown in FIGS. 3, 4A and 4B, the second carrier plate 8 is formed with four connection elements 23, each radially outwardly projecting from the radially outer peripheral portion of the second carrier plate 8 having a generally planar portion. The first carrier plate 7, the second carrier plate 8, the pinion shafts PS, the pinion gears P1, and the connection elements 23 explained in the present embodiment constitute as a whole a carrier assembly according to the present invention.

The pinion gears P1 are shown in FIG. 2 to be rotatably supported on the respective pinion shafts PS through the corresponding bearings 27. Each of the pinion shafts PS is formed with oil passageways 26a, 26b leading to the bearing 27.

The oil passageways 26a, 26b are held in communication with an oil passageway 25a axially formed in the input shaft 17 and an oil passageway 25b communicated with the oil passageway 25a and radially formed in the input shaft 17, so that the oil in the oil passageways 25a, 25b can be supplied to the bearing 27 through the oil passageways 26a, 26b. The bearing 27 is lubricated by the supplied oil.

The carrier assembly shown in FIG. 1 is a cross-sectional view taken along the line C-C in FIG. 3. The carrier assembly shown in FIG. 2 is a cross-sectional view taken along the line D-D in FIG. 3. FIG. 4A is a plan view of the first carrier plate 7 pressed and shaped by a press working. FIG. 4B is a plan view of the second carrier plate 8 pressed and shaped by a press working.

In the carrier assembly, the connection elements 23 are bent toward the first carrier plate 7 to weld and fix the outwardly projected end portions 23b of the connection elements 23 with the radially outer peripheral portion of the first carrier plate 7 by electron beam welding. The carrier assembly is constructed in such a manner that the first and second carrier plates 7, 8 are connected to each other through the connection elements 23 with the connection elements 23 each circumferentially interposed between the pinion gears P1. In FIG. 3, the portions welded and fixed by the electron beam welding are each indicated by reference numeral 24.

Figure 5:
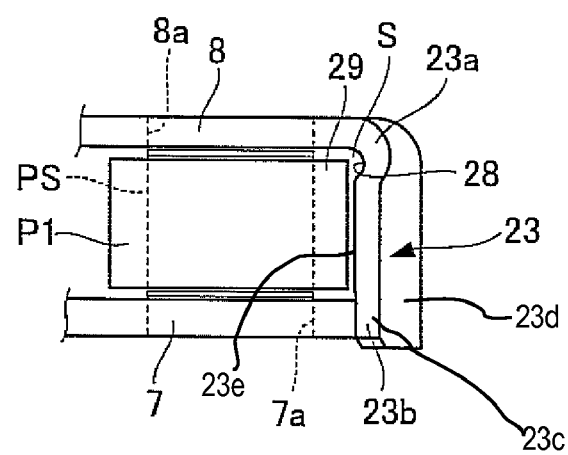
FIG. 5 is a view showing one embodiment of the carrier assembly according to the present invention, and a view showing the positional relationship between the pinion gear and the connection element as seen in the direction indicated by the arrow F in FIG. 3.
Figure 6:
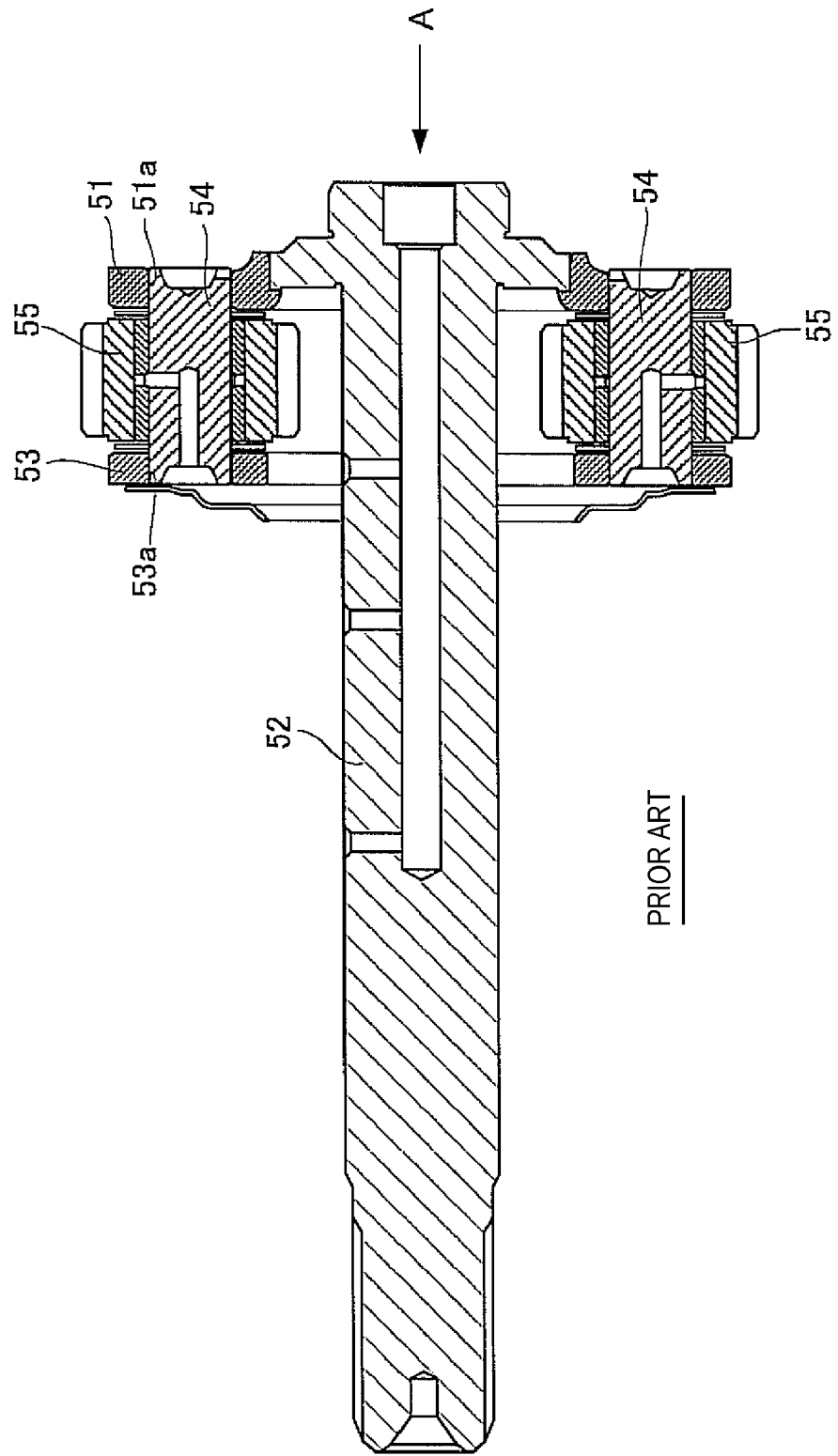
FIG. 6 is a cross-sectional view of the conventional carrier assembly.
Figure 7:
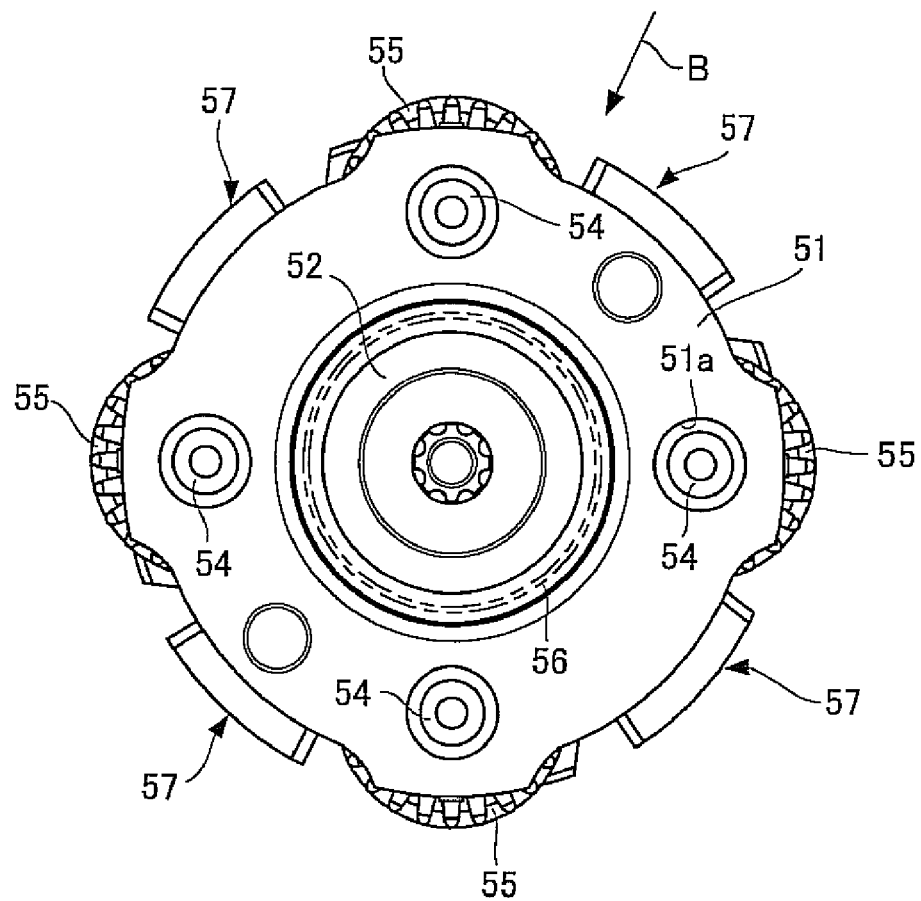
FIG. 7 is a view as seen in the direction indicated by the arrow A in FIG. 6.
Figure 8A:
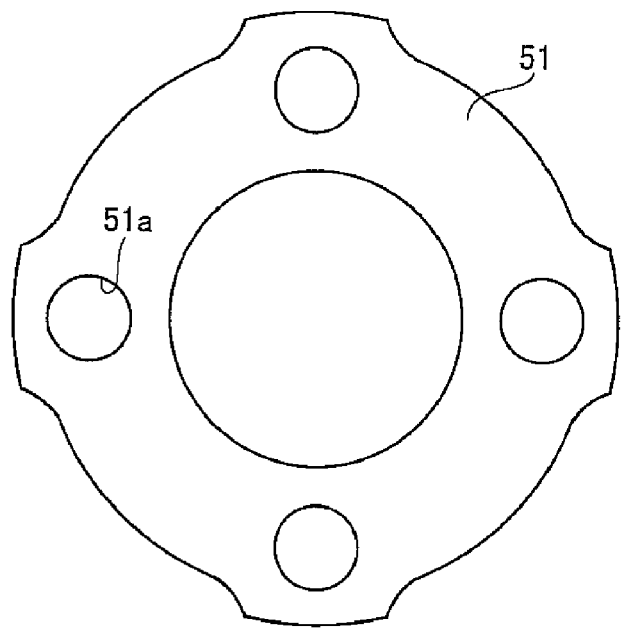
FIG. 8A is a view showing the conventional carrier assembly, and a plan view showing the first carrier plate pressed and shaped by a press working.
Figure 8B:
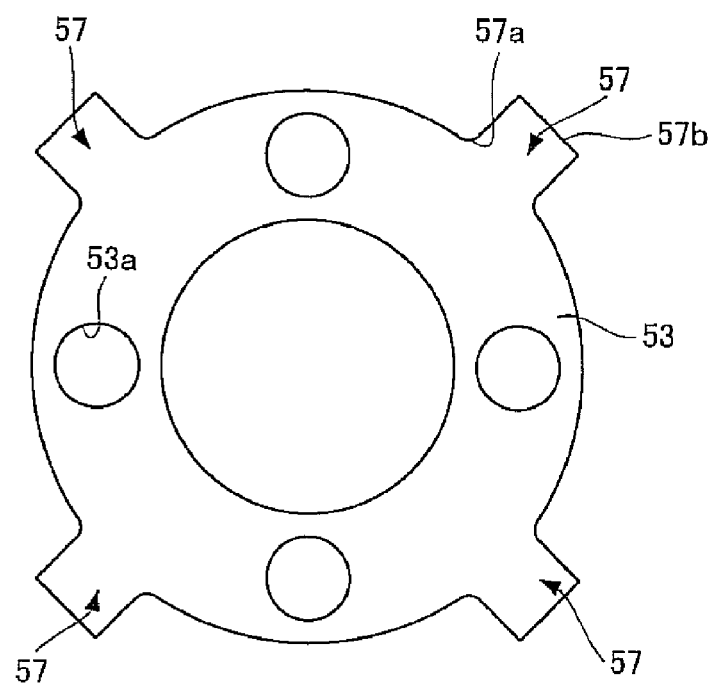
FIG. 8B is a view showing the conventional carrier assembly, and a plan view showing the second carrier plate pressed and shaped by a press working.
Figure 9:
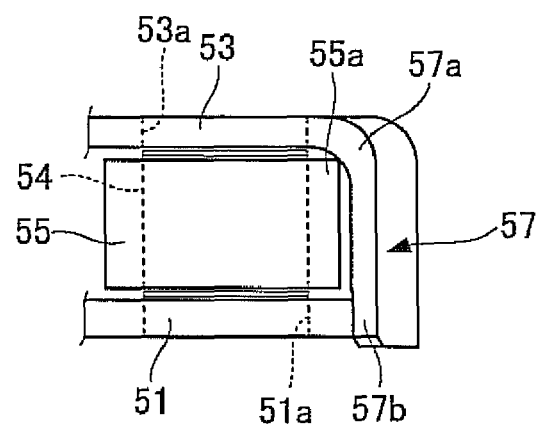
FIG. 9 shows a view showing the positional relationship between the pinion gear and the connection element as seen in the direction indicated by the arrow B in FIG. 7.

The connection elements 23 have respective base portions 23a, a pair of side edges 23c, and first surfaces 23d and opposite second surfaces 23e. The first surfaces 23d and the second surfaces 23e extend between the pair of side edges 23c. The connection elements 23 are bent such that the connection elements 23, including a portion of the base portion 23a, extend in a direction that is generally normal to the planar portion of the second carrier plate 8. The base portions 23a are in close proximity to the radially outer peripheral portion of the second carrier plate 8 and are each formed with a notch 28 serving as a receded portion according to the present invention. The notch 28 is dented in the circumferential direction of the second carrier plate 8 at the base portion 23a of the connection element 23. The notch 28 extends between the first surface 23d and the second surface 23e of the base portion 23a of the connection elements 23. The notch 28 is formed at least partially in the portion of the base portion 23a that extends generally normal to the planar portion of the second carrier plate 8. The notch 28 thus formed makes a gap S, as shown in FIG. 5, between the base portion 23a of the connection element 23 and the corner portion 29 of the pinion gear P1 in close proximity to the second carrier plate 8, when the connection elements 23 are bent toward the first carrier plate 7. The gap S makes it possible to prevent the corner portion 29 of the pinion gear P1 from being brought into frictional contact with the base portion 23a of the connection element 23.

This means that a wide attached area between the outwardly projected end portion 23b of the connection element 23 and the radially outer peripheral portion of the first carrier plate 7 can be ensured while securing a sufficiently wide width of the connection element 23, thereby making it possible to securely connect the first carrier plate 7 and the second carrier plate 8 with a sufficient fixing strength. In addition, the carrier assembly can be made small in size because of the first and second carrier plates 7, 8 not required to have respective diameters enlarged in the radial direction thereof.

Even in the case that each of the connection elements 23 has a sufficiently wide width in the present embodiment, the outwardly projected end portion 23b of the connection element 23 can be easily fixed to the radially outer peripheral portion of the first carrier plate 7, thereby making it possible to improve the assembling of the carrier assembly in workability.

While the foregoing description has been directed to the case in which the receded portion for making a gap between the base portion of the connection element and the corner portion of the pinion gear is implemented by a notch, any other construction may be applied to the receded portion, so long as the base portion of the connection element is spaced apart from the corner portion of the pinion gear. For example, the base portion of the connection element may partly be formed with a portion bulged away from the corner portion of the pinion gear to form a gap between the base portion of the connection element and the corner portion of the pinion gear.

Although the present embodiment has been explained about the carrier assembly that is applied to a single pinion type of planetary gear, the carrier assembly may be applied to a double pinion type or a ravigneau type of planetary gear. The carrier assembly having a construction according to the present invention may be applied to any other type of planetary gear.

Though the present embodiment has been explained about the electron beam welding, any other type of welding may of course be employed. Other than the welding method, pressure bonding utilizing caulking, adhesive bonding, sinter diffusion bonding, or the like may also be used.

Further, the above embodiment has been explained about the second carrier plate 8 formed with the connection elements 23, however, the first carrier plate 7 may be formed with the connection elements 23 according to the present invention. In this case, the second carrier plate 8 constitutes the first carrier plate while the first carrier plate 7 constitutes the second carrier plate according to the present invention.

The embodiments thus disclosed are simply exemplified in all aspects, and the present invention is not limited to the disclosed embodiments. The scope of the present invention should be construed on the basis of the claims covering not only the previously mentioned embodiments but also other equivalents and all modifications within the scope of the claims.

INDUSTRIAL APPLICABILITY

The carrier assembly according to the present invention can be utilized for a planetary gear and the like having a first carrier plate and a second carrier plate connected by a plurality of connection elements to rotatably support pinion gears disposed between the first carrier plate and the second carrier plate.

The invention claimed is:

1. A carrier assembly comprising:
    a first carrier plate formed with a plurality of first shaft holes radially inwardly positioned and circumferentially spaced apart from each other;
    a second carrier plate having a generally planar portion, the planar portion of the second carrier plate positioned in opposing relationship with the first carrier plate and formed with a plurality of second shaft holes radially inwardly positioned in opposing relationship with the first shaft holes;
    a plurality of pinion shafts extending through the respective first and second shaft holes;
    a plurality of pinion gears rotatably supported on the respective pinion shafts and held in mesh with a sun gear; and
    a plurality of connection elements each arranged between the second shaft holes in the circumferential direction of the second carrier plate and radially outwardly projecting from a radially outer peripheral portion of the second carrier plate, each of the connection elements having a first surface, an opposite second surface, and a pair of side edges, the first surface and the second surface extending between the pair of side edges; wherein
    the connection elements are each bent toward the first carrier plate to fix an outwardly projected end portion of the connection element with a radially outer peripheral portion of the first carrier plate so as to have the first carrier plate and the second carrier plate connected with each other with the connection elements each being circumferentially interposed between the pinion gears; and
    the connection elements each have a base portion in close proximity to the radially outer peripheral portion of the second carrier plate, the bend of each connection element is bent at the base portion, a portion of the base portion extends generally normal to the planar portion of the second carrier plate, the base portion being formed with a notch having a generally semicircular shape dented in the circumferential direction of the second carrier plate and extending between the first surface and the second surface of the connection element, the notch being formed at least partially at the bend and at least partially in the portion of the base portion that extends generally normal to the planar portion of the second carrier plate, the notch defines a gap between the base portion of the connection element and a corner portion of the pinion gear in close proximity to the radially outer peripheral portion of the second carrier plate to prevent the base portion of the connection element from being brought into frictional contact with the corner portion of the pinion gear.

2. A carrier assembly according to claim 1, wherein the outwardly projected end portion of the connection element is fixed with the radially outer peripheral portion of the first carrier plate by welding.

3. A carrier assembly according to claim 2, wherein the welding is electron beam welding.

4. A carrier assembly according to claim 1, wherein the outwardly projected end portion of the connection element is fixed with the radially outer peripheral portion of the first carrier plate by pressure bonding.

* * * * *